(12) United States Patent
Efrat Sela et al.

(10) Patent No.: US 11,731,639 B2
(45) Date of Patent: Aug. 22, 2023

(54) METHOD AND APPARATUS FOR LANE DETECTION ON A VEHICLE TRAVEL SURFACE

(71) Applicant: GM GLOBAL TECHNOLOGY OPERATIONS LLC, Detroit, MI (US)

(72) Inventors: Netalee Efrat Sela, Herzliya (IL); Max Bluvstein, Herzliya (IL); Dan Levi, Kyriat Ono (IL); Noa Garnett, Herzliya (IL); Bat El Shlomo, Hod Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 675 days.

(21) Appl. No.: 16/807,735

(22) Filed: Mar. 3, 2020

(65) Prior Publication Data

US 2021/0276574 A1 Sep. 9, 2021

(51) Int. Cl.
*B60W 50/00* (2006.01)
*B60W 10/04* (2006.01)
(Continued)

(52) U.S. Cl.
CPC ........ *B60W 50/0097* (2013.01); *B60W 10/04* (2013.01); *B60W 10/18* (2013.01);
(Continued)

(58) Field of Classification Search
CPC .. B60W 50/0097; B60W 10/04; B60W 10/18; B60W 10/20; B60W 30/09;
(Continued)

(56) References Cited

U.S. PATENT DOCUMENTS

2018/0172455 A1* 6/2018 Yamaguchi .......... G05D 1/0274
2019/0370572 A1* 12/2019 Nagpal .................... G06T 7/62
(Continued)

OTHER PUBLICATIONS

C. Yu, T. Wen, L. Chen and K. Jiang, "Common bird-view Transformation for Robust Lane Detection," 2019 IEEE 9th Annual International Conference on CYBER Technology in Automation, Control, and Intelligent Systems (CYBER), 2019, pp. 665-669, doi: 10.1109/CYBER46603.2019.9066500. (Year: 2019).*
(Continued)

*Primary Examiner* — Jelani A Smith
*Assistant Examiner* — Paul A Castro
(74) *Attorney, Agent, or Firm* — Quinn IP Law

(57) ABSTRACT

A vehicle having an imaging sensor that is arranged to monitor a field-of-view (FOV) that includes a travel surface proximal to the vehicle is described. Detecting the travel lane includes capturing a FOV image of a viewable region of the travel surface. The FOV image is converted, via an artificial neural network, to a plurality of feature maps. The feature maps are projected, via an inverse perspective mapping algorithm, onto a BEV orthographic grid. The feature maps include travel lane segments and feature embeddings, and the travel lane segments are represented as line segments. The line segments are concatenated for the plurality of grid sections based upon the feature embeddings to form a predicted lane. The concatenation, or clustering is accomplished via the feature embeddings.

19 Claims, 6 Drawing Sheets

(51) Int. Cl.
  *B60W 10/20* (2006.01)
  *B60W 10/18* (2012.01)
  *G06N 3/04* (2023.01)
  *G06N 3/08* (2023.01)
  *G01C 21/26* (2006.01)
  *B60W 30/12* (2020.01)
  *B60W 30/14* (2006.01)
  *B60W 30/09* (2012.01)
  *B60W 30/18* (2012.01)

(52) U.S. Cl.
  CPC ............... *B60W 10/20* (2013.01); *G06N 3/04* (2013.01); *G06N 3/08* (2013.01); *B60W 30/09* (2013.01); *B60W 30/12* (2013.01); *B60W 30/14* (2013.01); *B60W 30/18163* (2013.01); *G01C 21/26* (2013.01)

(58) Field of Classification Search
  CPC ............... B60W 30/12; B60W 30/14; B60W 30/18163; G06N 3/04; G06N 3/08; G06N 3/0454; G01C 21/26; G01C 21/3658; G06K 9/6218; G06K 9/6256; G06K 9/6267
  See application file for complete search history.

(56) References Cited

U.S. PATENT DOCUMENTS

2020/0082179 A1* 3/2020 Sugie ................ G06V 20/56
2020/0341466 A1* 10/2020 Pham ................ G06V 20/56
2021/0166340 A1* 6/2021 Nikola ................ G06T 3/00

OTHER PUBLICATIONS

Bertozzi, Broggi, Fascioli; "Stereo inverse perspective mapping: theory and applications"; 1998 Elsevier Science B.V.; Imagine and Vision Computing 16 (1998) 585-590.

Muad, Hussain, Samad; Mustaffa, Majlis; Implementation of Inverse Perspective Mapping Algorithm for the Development of an Automatic Lane Tracking System; 2004IEEE.

Mallot, Bulthoff, Little, Bohrer; Inverse Perspective Mapping Simplifies Optical Flow Computation and Obstacle Detection; Biological Cybernetics 64, 177-185, Feb. 1991.

* cited by examiner

METHOD AND APPARATUS FOR LANE DETECTION ON A VEHICLE TRAVEL SURFACE

INTRODUCTION

Vehicles, including those vehicles employing advanced driver assistance systems (ADAS) and autonomous systems, may make use of information related to location of travel lanes to inform an operator and/or to direct operational control of one or more systems of the vehicle. Vehicle control systems may benefit from information related to dynamically locating travel lanes, and may employ such information as an input for controlling one or more systems such as braking, cornering and acceleration.

Accurate detection of travel lanes plays a crucial role in autonomous driving for several reasons, including providing cues regarding available maneuvers of the vehicle, accurately locating the vehicle with respect to a digitized map, and enabling automatic construction of maps associated with accurate localization of the vehicle. As such, there is a need for accurate three-dimensional lane detection and localization of travel lanes. Furthermore, it is desirable to be able to quickly, accurately and precisely detect, monitor and respond to travel lanes of a travel surface that are in a trajectory of a vehicle employing information from an imaging sensor.

SUMMARY

A method, apparatus, and system are able to provide a three-dimensional digital lane representation that includes various lane topologies, including but not limited to urban situations, splits, merges, etc., which may be generalized to unseen cameras and scenes. This includes a vehicle having an imaging sensor and a controller, wherein the imaging sensor includes, by way of non-limiting examples, a camera or a LiDAR sensor. The imaging sensor is arranged to monitor a field-of-view (FOV) that includes a travel surface proximal to the vehicle. A method and associated system for detecting a travel lane proximal to the vehicle are described, and include capturing, via the imaging sensor, a FOV image of a viewable region of the travel surface. The FOV image is converted, via an artificial neural network, to a plurality of feature maps. The feature maps are projected, via an inverse perspective mapping algorithm, onto a BEV orthographic grid, wherein the BEV orthographic grid includes a plurality of grid sections representing ground truth of the travel surface. The feature maps include travel lane segments and feature embeddings that are represented in the plurality of grid sections of the BEV orthographic grid, and the travel lane segments are represented as line segments in the plurality of grid sections. The line segments are concatenated for the plurality of grid sections based upon the feature embeddings to form a predicted lane in the BEV orthographic grid. The concatenation, or clustering is accomplished via the feature embeddings. The feature embeddings of each grid section are associated to vectors that are learned such that vectors belonging to the same lane are embedded nearby in an embedded space, and vectors belonging to different lanes are embedded far away in the embedded space. Clustering may be applied on these vectors to achieve separation to different lanes.

Operation of the vehicle is controlled based upon the predicted lane in the BEV orthographic grid. This may include, by way of example controlling operation of the vehicle, controlling navigation and route planning of the vehicle, communicating the predicted lane to proximal vehicles, and updating on-vehicle map data and/or off-vehicle map data based thereon. Controlling operation of the vehicle based upon the predicted lane includes controlling, via an advanced driver assistance system, one of a propulsion system, a steering system, or a braking system.

An aspect of the disclosure includes each of the line segments being parameterized as a normal vector that is defined in relation to a center point of the grid section, the normal vector being defined by a magnitude, a direction, and an altitude in relation to the center point of the grid section.

Another aspect of the disclosure includes the travel lane segments being represented as straight line segments in the plurality of grid sections, and wherein each of the predicted lanes comprises a concatenated set of the straight line segments in adjacent ones of the plurality of grid sections.

Another aspect of the disclosure includes the travel lane segments being represented as non-linear line segments in the plurality of grid sections, and wherein each of the predicted lanes comprises a concatenated set of the non-linear line segments in adjacent ones of the plurality of grid sections.

Another aspect of the disclosure includes concatenating the travel lane segments for the plurality of grid sections by clustering the feature embeddings to achieve separation to individual travel lanes.

Another aspect of the disclosure includes capturing the field-of-view (FOV) image of the viewable region that includes the travel surface that is forward of the vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2-1 pictorially shows a field-of-view (FOV) image of a travel surface including a planar multi-lane road surface, in accordance with the disclosure.

FIG. 2-2 pictorially shows a bird's eye view (BEV) image of the travel surface including the planar multi-lane road surface that is shown with reference to FIG. 2-1, in accordance with the disclosure.

FIG. 2-3 graphically illustrates a BEV orthographic grid of the planar multi-lane road surface that is shown with reference to FIG. 2-1, including orthographic mapping of a plurality of lane edges, in accordance with the disclosure.

FIG. 3 pictorially shows an FOV image of a travel surface including a non-planar, curved multi-lane road surface, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

The concepts described herein provide a lane representation that allows for learning general three-dimensional (3D) lane segments from a BEV perspective. This gives an interpretable intermediate representation for the lane prediction, efficiently and accurately predicts a high resolution lane curve using a low resolution BEV grid, enables robust lane prediction even on new, unseen scenarios, and allows for end-to-end prediction of entire lane curves in a learnable fashion through feature embeddings. This also allows for better fusion with other modalities and tasks such as LiDAR and free-space which can be represented as an occupancy grid. In addition to the top view representation of the segments described above, each grid section also outputs the segments height relative to the ground plane. This results in lane points representation in 3D, i.e. the (x,y,z) lane point location, and orientation of the lane segment passing through this point.

Figure 1:
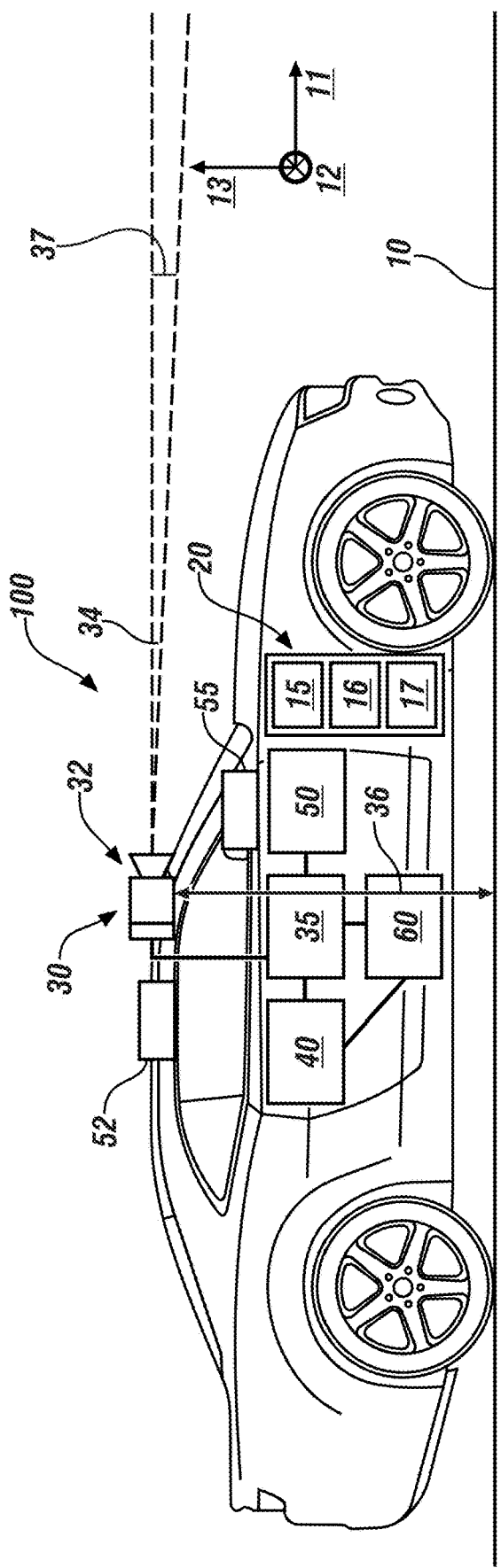
FIG. 1 schematically illustrates a side-view of a vehicle including a spatial monitoring system, wherein the vehicle is disposed on a travel surface, in accordance with the disclosure.

Referring to the drawings, wherein like reference numerals correspond to like or similar components throughout the several Figures, FIG. 1, consistent with embodiments disclosed herein, schematically illustrates a vehicle 100 that is disposed on a travel surface 10, wherein the vehicle 100 includes a propulsion system 15, a steering system 16, a wheel braking system 17, an advanced driver assistance system (ADAS) 20, a spatial monitoring system 30, and a navigation system 40. A side-view of the vehicle 100 is shown. The vehicle 100 is disposed on and able to traverse a travel surface 10 such as a paved road surface.

The travel surface 10 may be configured as a single travel lane, a two-lane highway, a multi-lane divided highway, and may include entrance ramps, exit ramps, splits, merges, intersections, roundabouts, etc., without limitation. The vehicle 100 and the travel surface 10 define a three-dimensional coordinate system including a longitudinal or y-axis 11, a lateral or x-axis 12 and an attitudinal or z-axis 13. The longitudinal axis 11 is defined as being equivalent to a direction of travel of the vehicle 100 on the travel surface 10. The lateral axis 12 is defined as being orthogonal to the direction of travel of the vehicle 10 on the travel surface 10. The attitudinal axis 13 is defined as being orthogonal to a plane defined by the longitudinal axis 11 and the lateral axis 12, i.e., as projecting perpendicular to the travel surface 10 at the present location of the vehicle 100. Other on-vehicle systems may include, by way of non-limiting examples, a computer-readable storage device or media (memory) that includes a digitized roadway map, a telematics system 60, a global navigation satellite system (GNSS) sensor 52, and a human/machine interface (HMI) device 55. The concepts described herein may be employed on various systems that may benefit from information determined from an embodiment of the spatial monitoring system 30 in a manner that is described herein. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, and as described herein, the spatial monitoring system 30 includes an imaging sensor 32 that has a field-of-view (FOV) of a viewable region 34 that includes a travel surface that is proximal to and forward of the vehicle 100, and is in communication with a spatial monitoring controller 35. Alternatively, or in addition, the imaging sensor 32 has a field-of-view (FOV) of a viewable region 34 that includes a travel surface 10 that is beside and or rearward of the vehicle 100. The imaging sensor 32 may be a 2D digital camera, a 3D digital camera, or a light detection and radar (LiDAR) device. The imaging sensor 32 has an on-vehicle position and orientation that can be characterized, including height $h_{cam}$ 36 and angle $\theta_{cam}$ 37, which are defined relative to the attitudinal axis 13. One or multiple imaging sensors 32 may be employed. The concepts described herein may be employed on various systems that may benefit from information determined from an embodiment of the spatial monitoring system 30. When employed in combination with information from the GNSS sensor 52, the spatial monitoring controller 30 determines geospatial locations of objects that are in the viewable region 34 of the vehicle 100. The spatial monitoring system 30 may include other spatial sensors and systems that are arranged to monitor the viewable region 34 forward of the vehicle 100 including, e.g., a surround-view camera or a radar sensor, which may be employed to supplant, supplement, or complement spatial information that is generated by the imaging sensor 32. Each of the spatial sensors is disposed on-vehicle to monitor the viewable region 34 to detect proximate remote objects such as road features, lane markers, buildings, pedestrians, road signs, traffic control lights and signs, other vehicles, and geographic features that are proximal to the vehicle 100. The spatial monitoring controller 35 can evaluate inputs from the spatial sensors to determine a linear range, relative speed, and trajectory of the vehicle 100 in view of each proximate remote object. The spatial sensors can be located at various locations on the vehicle 100, including the front corners, rear corners, rear sides and mid-sides. The spatial sensors can include a front radar sensor and a camera in one embodiment, although the disclosure is not so limited. Placement of the spatial sensors permits the spatial monitoring controller 35 to monitor traffic flow including proximate vehicles, intersections, lane markers, and other objects around the vehicle 100. As employed herein, the terms "proximate", "proximal" and related terms refer to stationary and mobile objects that are in the vicinity of the vehicle 100 such that they are discernible by one or more of the spatial sensors connected to the spatial monitoring controller 35 including the spatial monitoring system 30.

The telematics system 60 provides extra-vehicle communications, including communicating with a communication network system that may include wireless and wired communication capabilities. The telematics system 60 includes a telematics controller that is capable of extra-vehicle communications that includes vehicle-to-everything (V2X) communication. The V2X communication includes short-range vehicle-to-vehicle (V2V) communication, and communication with one or more roadside units, thus facilitating localized communication between a plurality of similarly-situated vehicles. Alternatively, or in addition, the telematics system 60 is capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with an off-board controller via a communication network. Alternatively, or in addition, the telematics system 60 executes the extra-vehicle communication directly by communicating with the off-board controller via the communication network.

The ADAS 20 is arranged to provide operator assistance features by controlling one or more of the propulsion system 15, the steering system 16, the braking system 17, with little or no direct interaction of the vehicle operator. The ADAS 20 includes a controller and one or a plurality of subsystems that provide operator assistance features, including one or more of an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 20 may interact with and access information from an on-board map database for route planning and to control operation of the vehicle 100 via the lane-keeping system, the lane-centering system, and/or other systems that are configured to command and control autonomous vehicle operation. Autonomous operating commands may be generated to control the ACC system, the LKY system, the LCC system, the autonomous braking/collision avoidance system, and/or the other systems. Vehicle operation includes operation in a propulsion mode in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figures 1, 2:
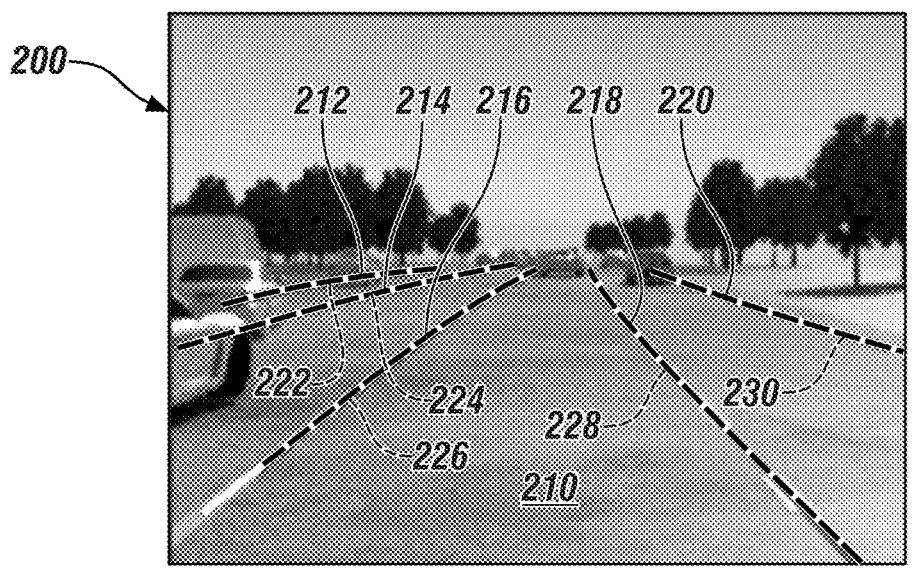
Figure 2:
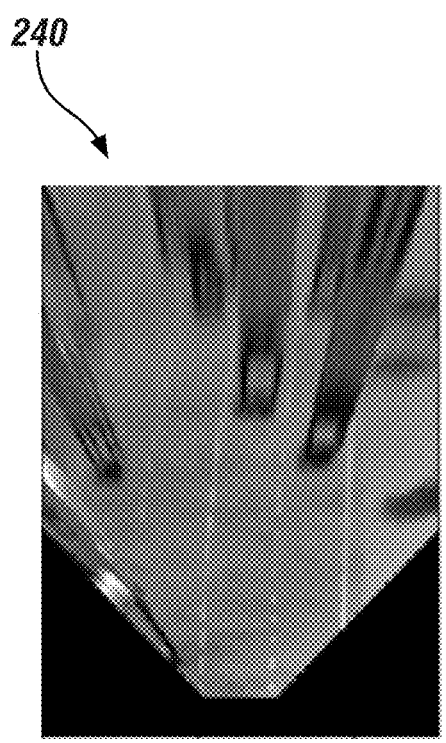

FIG. 2-1 pictorially shows an FOV image 200 of a viewable region 34 that has been captured from an embodiment of the imaging sensor 32 of an embodiment of the vehicle 100 of FIG. 1 that is traveling on a multi-lane road surface 210 that is planar in the x and y dimensions. Actual lane edges 212, 214, 216, 218 and 220 and detected lane edges 222, 224, 226, 228, and 230 are indicated.

FIG. 2-2 pictorially shows a bird's eye view (BEV) image 240 that is generated by performing inverse perspective mapping on the FOV image 200 of the viewable region 34 of FIG. 2-1.

Figures 2, 3:
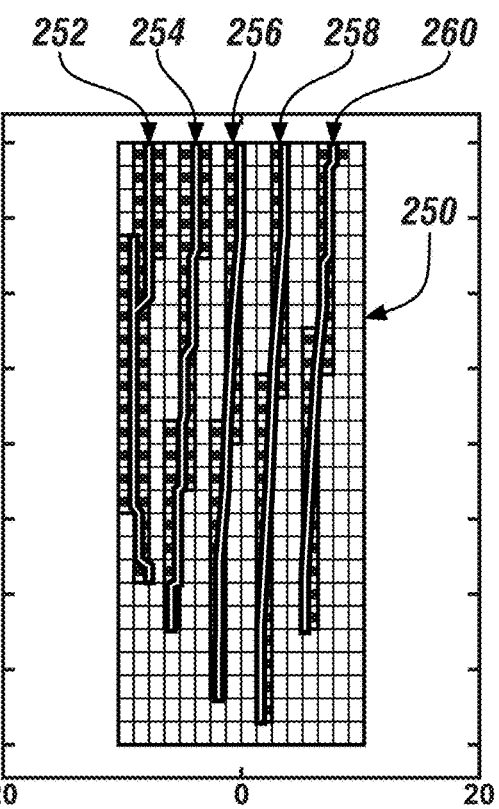
Figure 3:
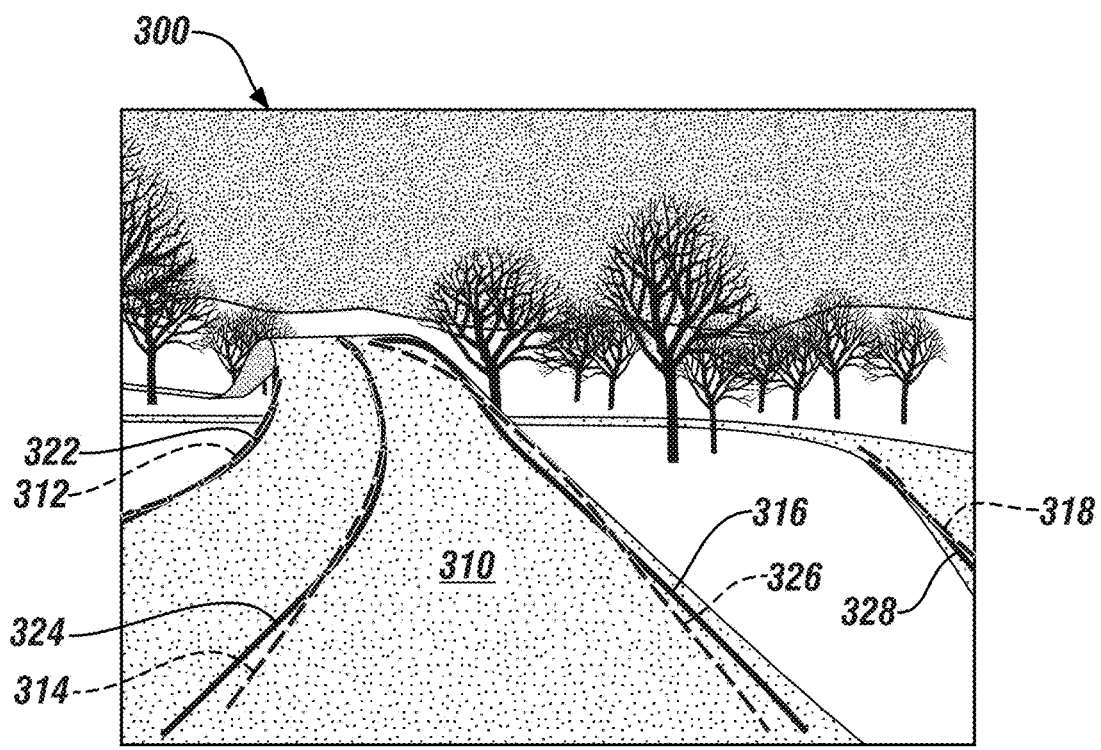

FIG. 2-3 graphically shows an orthographic mapping 250 of the actual lane edges, wherein lines 252, 254, 256, 258 and 260 represent the detected lane edges 222, 224, 226, 228, and 230, respectively that are shown in FIG. 2-1, and are derived from the BEV image 240 that is shown in FIG. 2-2. Because the multi-lane road surface 210 is flat in the x and y dimensions, there is no deformation of the orthographic mapping of the detected lane edges 222, 224, 226, 228, and 230 in relation to the actual lane edges 212, 214, 216, 218 and 220.

FIG. 3 pictorially shows a FOV image 300 of a viewable region 34 that has been captured from an embodiment of the imaging sensor 32 of an embodiment of the vehicle 100 of FIG. 1 that is traveling on a multi-lane road surface 310, wherein the multi-lane road surface 310 includes an elevation change and/or is curved, i.e., varies in either or both the x dimension and the y dimension. Actual lane edges 322, 324, 326, and 328, and detected lane edges 312, 314, 316, and 318, respectively, are indicated. This result indicates that at least a portion of the detected lane edges 312, 314, 316, 318 are distorted relative to the actual lane edges 322, 324, 326, 328, respectively. The actual lane edges 322, 324, 326, and 328 represent ground truth. The perspective mapping that assumes a plane deforms the lane as it appeared on the image. When a lane is not on the plane, the deformed perceptive projection may be employed to infer a 3D perspective and to predict lane locations in 3D.

Figure 4:
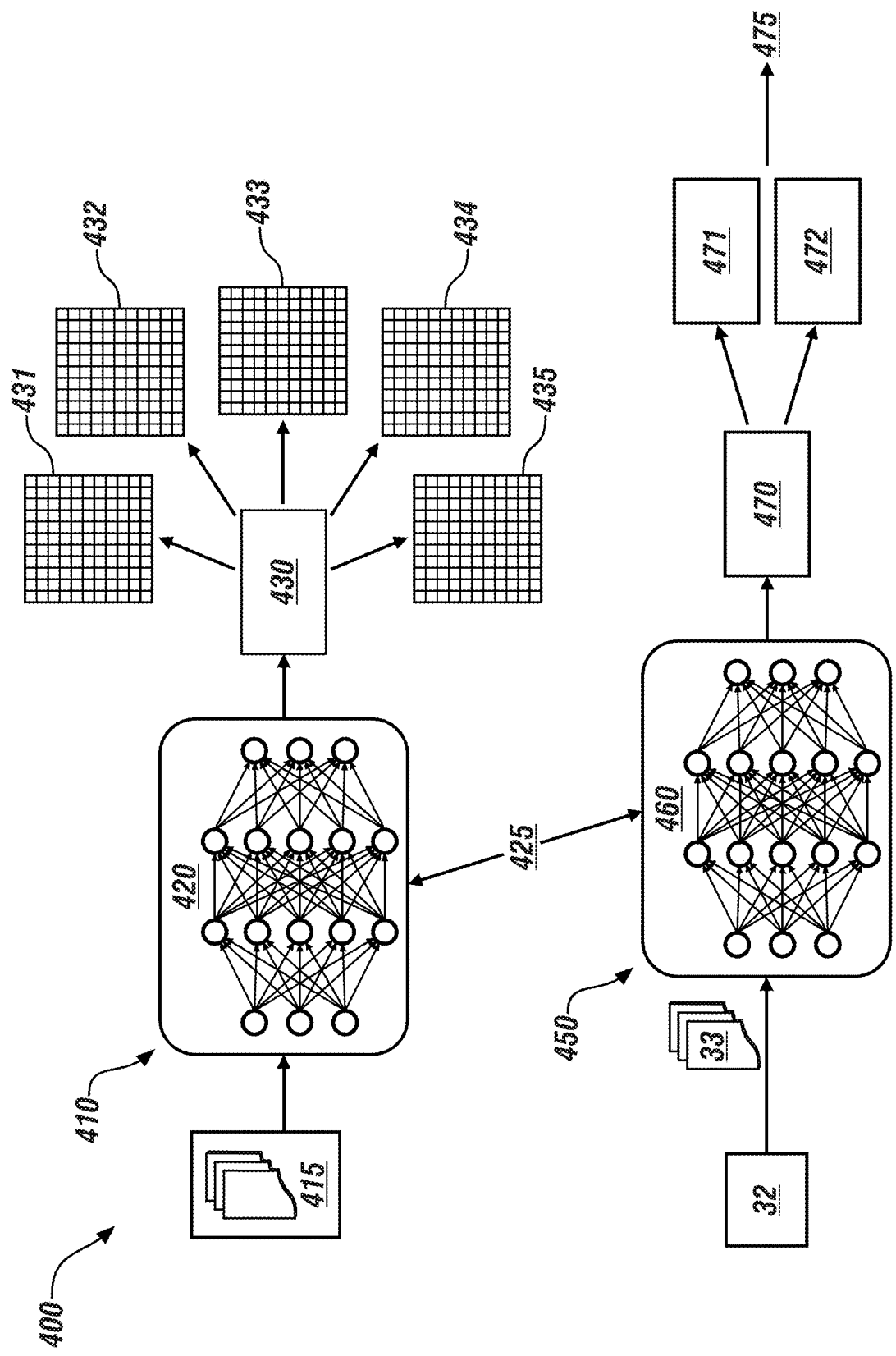
FIG. 4 schematically illustrates a method for processing images from an on-vehicle imaging sensor to form one or a plurality of predicted lanes that digitally represent a vehicle travel surface, in accordance with the disclosure.

Referring now to FIG. 4, et seq., with continued reference to FIG. 1, a lane detection method 400 is described for processing FOV images 33 from the on-vehicle imaging sensor 32 of the vehicle 100 to form one or a plurality of predicted lanes that digitally represent the travel surface 10 that is proximal to the vehicle 100. The predicted lanes may be used for vehicle control, mapping and other purposes. The lane detection method 400 includes a concept, framework, methodologies and algorithms for processing FOV images 33 captured by the on-vehicle imaging sensor 32. The imaging sensor 32 is arranged to monitor the viewable region 34 that includes the travel surface 10 proximal to the vehicle 100 and periodically capture the FOV images 33. Detecting a travel lane proximal to the vehicle 100 includes capturing, via the imaging sensor 32, an FOV image 33 of the travel surface 10 forward of the vehicle 100, and converting, via an artificial neural network, the FOV image 33 to a plurality of feature maps that are associated with the travel surface 10. The feature maps are projected, via an inverse perspective mapping algorithm, to a BEV orthographic grid, wherein the BEV orthographic grid includes a plurality of grid sections representing ground truth. An example BEV orthographic grid is illustrated with reference to FIG. 5. The feature maps include travel lane segments that are represented in the plurality of grid sections of the BEV orthographic grid, and the travel lane segments are represented as straight line segments in the plurality of grid sections, in one embodiment. Alternatively, the travel lane segments may be represented as another parametric function in the plurality of grid section, such as by a second-degree polynomial equation. Each of the straight line segments may be parameterized as a normal vector that is defined in relation to a center point of the orthographic grid section, with the normal vector being defined by a magnitude, a direction, and an altitude in relation to the center point of the orthographic grid section. The straight line segments are concatenated for the plurality of orthographic grid sections to form one or a plurality of predicted lanes in the BEV orthographic grid, wherein concatenating is accomplished via learned feature embeddings. Concatenating the line segments includes linking together lane segment edges that are identified in adjacent ones of the orthographic grid sections. Operation of the vehicle 100 is controlled based upon the predicted lane(s) in the BEV orthographic grid. This may include, by way of example controlling operation of the vehicle 100, controlling navigation and route planning of the vehicle 100, communicating the predicted lane(s) to proximal vehicles, updating on-vehicle map data and/or off-vehicle map data based thereon, and generating a new map based thereon.

Referring again to FIG. 4, the lane detection method 400 is arranged, in one embodiment, as a backbone architecture, which includes an artificial neural network (ANN) training phase 410 and an ANN inference phase 450 that utilizes an ANN 460 to extract BEV feature maps from the images. The ANN inference phase 450 includes identifying straight line segments in orthographic grid sections of the BEV feature maps. The straight line segments are concatenated to form lane edges in the BEV orthographic grids.

The ANN training phase 410 includes converting, via a training artificial neural network 420, each of a plurality of training images 415 to a plurality of feature maps 430 and projecting, via an inverse perspective mapping algorithm, the plurality of feature maps 430 onto a corresponding BEV orthographic grid, which is defined in context of ground truth. Implementation and execution of an inverse perspective mapping algorithm is understood, and not described in detail herein.

The feature maps 430 include a first feature map 431 that contains a segment score for each of the grid sections of the BEV orthographic grid.

Figure 5:
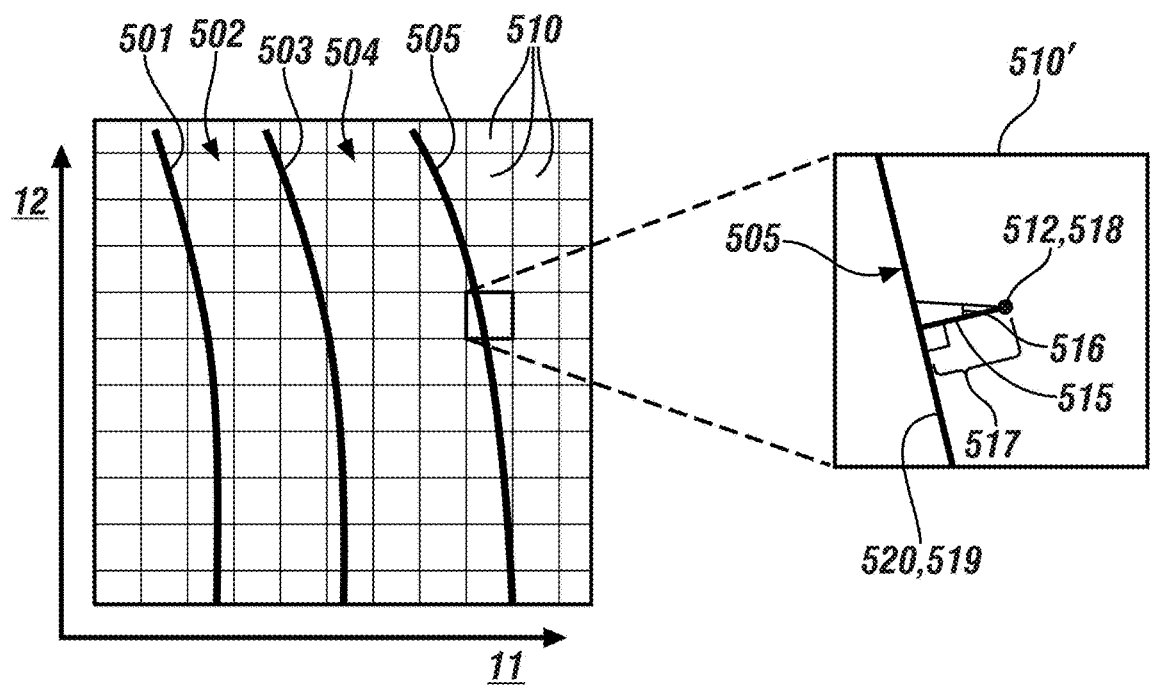
FIG. 5 schematically shows an example of a BEV orthographic grid associated with an example FOV image, including an exploded view of an orthographically-arranged grid sections including a travel lane segment that includes a portion of a lane edge, in accordance with the disclosure.

The feature maps 430 include a second feature map 432 that contains, for each of the grid sections of the BEV orthographic grid, a magnitude (length) of the orthogonal line, e.g., an offset magnitude 517 of an orthogonal line 515 in relation to a center point 512 that is illustrated in FIG. 5.

The feature maps 430 include a third feature map 433 that contains, for each of the grid sections of the BEV orthographic grid, an orientation (angle) of the orthogonal line, e.g., the angle 516 of the orthogonal line 515 in relation to the x-axis 11 that is illustrated in FIG. 5.

The feature maps 430 include a fourth feature map 434 that contains, for each of the grid sections of the BEV orthographic grid, an elevation (z-axis height) of the travel lane segment, e.g., a height of the travel lane segment 520 that is illustrated in FIG. 5.

The feature maps 430 include a fifth feature map 435 that contains, for each of the grid sections of the BEV orthographic grid, a probability value indicating a likelihood that an edge of the travel lane segment passes through the respective orthographic grid section. The feature embedding is trained such that grid sections from the same lane segment have features that are closely positioned in an embedded space, and distal from features of grid sections that belong to another lane in the embedded space. This is described with reference to FIG. 8.

The training images 415 and the feature maps 430 may be employed to train the training artificial neural network 420, which generates a plurality of coefficients 425 that are transferred to the ANN inference phase 450. In one embodiment, an image analysis process may be based on image processing that includes a hand-crafted feature analysis approach, which may include manually extracting features, then training of classifiers separately based on machine learning. Alternatively, or in addition, a deep learning approach may be employed to unify the feature extraction process and the classification step through several layers of an artificial neural network, e.g., the training artificial neural network 420. During execution of an artificial neural network training process, the coefficients 425 of the artificial neural network may be learned, and then in real-time the FOV image 33 is fed into a trained artificial neural network in the form of the ANN inference phase 450. Offline training and online analysis are based on a common approach that includes training to learn the unknown parameters, with the online analysis executed to feed images into the parameter-learned approach for classification.

FIG. 5 schematically shows an example of a BEV orthographic grid 500 associated with an example FOV image 33, and illustrates features that are learned for each grid section 510. The BEV orthographic grid 500 represents a field of view that is forward of the vehicle 100, and includes first and second predicted lanes 502, 504, respectively, which are delineated by first, second and third lane edges 501, 503, and 505. The BEV orthographic grid 500 includes a plurality of orthographically-arranged grid sections 510 that represent ground truth, which can be defined relative to the x-axis 12 and the y-axis 11. Each FOV image 33 is evaluated to extract information including travel lane sections that are indicated by lane markers, paint lines, etc., which may indicate one of the lane edges, e.g., one of the first, second and third lane edges 501, 503, and 505, which are used to form the first and second predicted lanes 502, 504. Sections of the first, second and third lane edges 501, 503, and 505 are captured in corresponding ones of the grid sections 510.

One of the orthographically-arranged grid sections 510, indicated by numeral 510', is illustrated in an exploded view, and includes a travel lane segment 520, which is a portion of the third lane edge 505 as shown. The orthographic grid section 510' includes a center point 512, and the travel lane segment 520 is represented as being a straight line segment. An orthogonal line 515 is indicated from the center point 512 to the travel lane segment 520. The orthogonal line 515 is a line segment that is orthogonal to the travel lane segment 520 and includes the center point 512. The orthogonal line 515 may include features that include an angle 516 in relation to the x-axis 12, and offset magnitude 517 in relation to the center point 512. The travel lane segment 520 may include features including a z-axis height 518 in relation to a z-axis height of the vehicle 100. The travel lane segment 520 may also include features including a parameter 519 indicating a probability that one of the travel lanes passes through the respective grid section 510'. The foregoing features may be captured in a plurality of feature maps.

A general curve representation is deployed for lane detection and localization tasks, employing dual pathway architectures to process the input image to Bird's Eye View (BEV) representation, with the BEV grid divided into coarse grid sections, and with parameters of each lane segment that passes through these grid sections being regressed.

This representation is both compact and allows for real time calculations, yet yields accurate lane localization by regressing the exact lane position within each grid section. In addition, it is robust to unseen cameras and scenes from different lane topologies and geometries. Camera robustness is achieved through the use of the BEV, which normalizes both camera intrinsics and extrinsics, and achieves the robustness to different topologies and geometries as lane segments are learned across different grid sections independently of each other. This increases the size of the training set because the batch size is determined based upon the number of lane segments. At the extreme, casting the lane detection task as semantic segmentation is more robust in that sense, however, working on larger grid sections achieves both faster computations, and high level understanding of the lane line being. As such, each of the orthographically-arranged grid sections 510 of the BEV orthographic grid 500 may be characterized by a center point; a linear travel lane segment; an orthogonal line between the linear travel lane segment and the center point, wherein the orthogonal line has features of an angle and an offset magnitude; a z-axis height; and a probability that the travel lane segment passes therethrough.

Referring again to FIG. 4, the ANN inference phase 450 includes converting, via the ANN 460, each FOV image 33 to a plurality of BEV feature maps 470, which are projected, via the inverse perspective mapping routine, onto a BEV orthographic grid 500, an example of which is shown with reference to FIG. 5.

The ANN inference phase 450 employs the ANN 460 and the plurality of coefficients 425 to extract BEV feature maps 470 from the FOV images 33 by projecting, via the inverse perspective mapping routine, the plurality of feature maps onto the BEV orthographic grid. The grid sections of the BEV orthographic grid of the BEV feature maps are interpreted to construct straight line segments (471), which are clustered and concatenated (472) to form predicted lane(s) 475 in the BEV orthographic grids via learned features. An example of a BEV feature map 500 that includes a plurality of predicted lanes 502, 504 is schematically illustrated with reference to FIG. 5.

Figure 8:
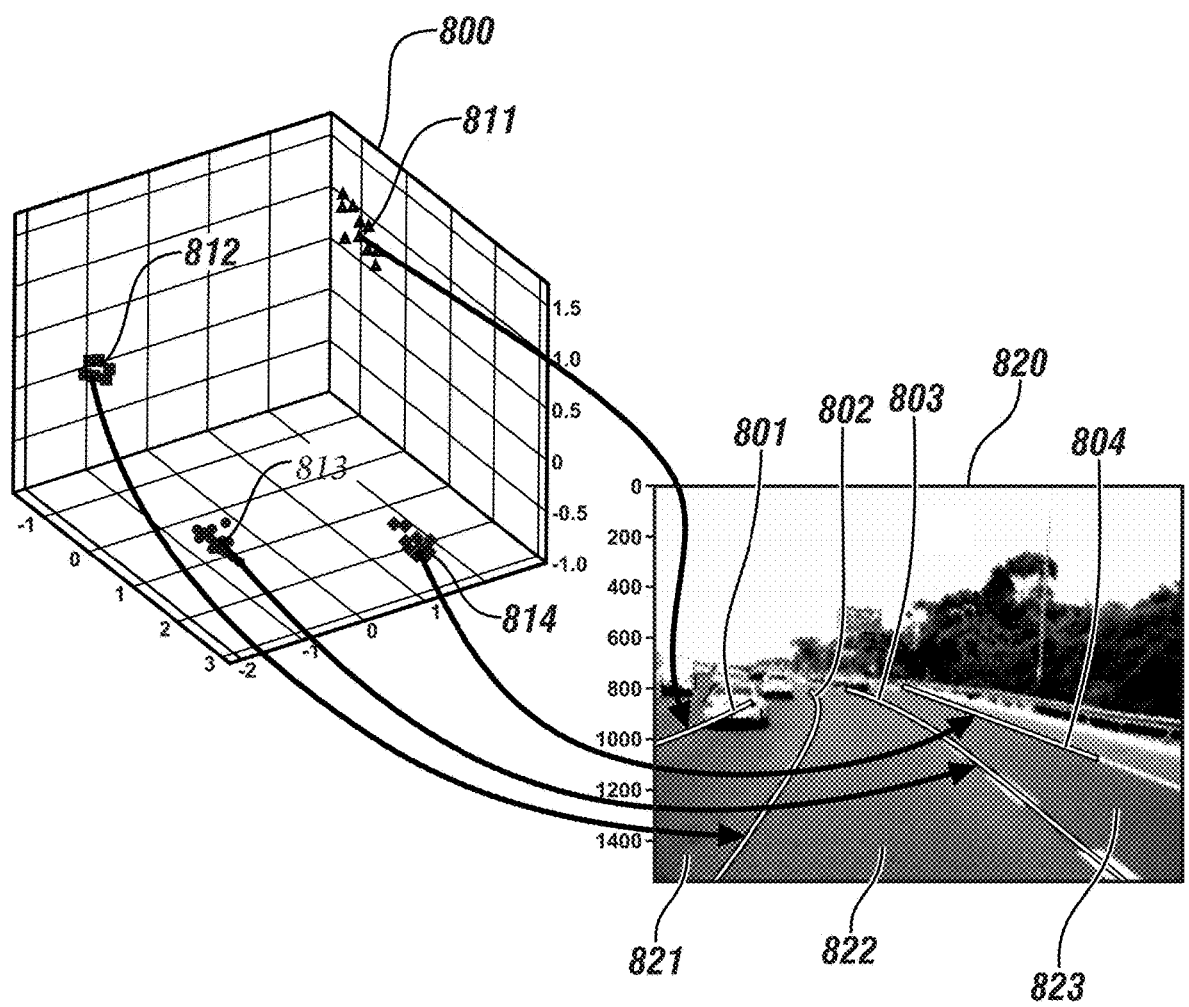
FIG. 8 pictorially shows a BEV orthographic grid, corresponding three-dimensional clusters representing embedded features, and corresponding lanes of an exemplary FOV image, in accordance with the disclosure.

FIG. 8 pictorially shows a BEV orthographic grid 800, analogous to the BEV orthographic grid 500 shown with reference to FIG. 5. The BEV orthographic grid 800 includes a plurality of orthographically-arranged grid sections that represent ground truth. Each of the grid sections includes a feature vector, which is represented in a third dimension. One element of the learning process is illustrated and described with reference to the ANN training phase 410 of FIG. 4. The feature vectors associated with the BEV orthographic grid 800 are represented as clusters 811, 812, 813, and 814, respectively, and the clusters 811, 812, 813, and 814, translate to lanes 821, 822, 823, and 824, respectively, of example FOV image 820.

Concatenating the travel lane segments for the plurality of orthographic grid sections includes clustering the feature embeddings to achieve separation to individual travel lanes. The learning process steers the vectors of the grid sections belonging to the same lane to be proximal in the embedded space, and steers the vectors of the grid sections belonging to different lanes to be distal in the embedded space. This is what is being illustrated by the clusters 811, 812, 813, and 814 of the three-dimensional element 810, which illustrates three principal components, which are subjected to a linear decomposition such as a principal component analysis (PCA) of the tiles feature vectors. Principal component analysis (PCA) is a statistical procedure that uses an orthogonal transformation to convert a set of observations of possibly correlated variables into a set of values of linearly uncorrelated variables called principal components. The feature vector dimension is 16 in one embodiment, and is a design choice. Three of the principal components are illustrated.

The FOV image 820 also illustrates the clusters 811, 812, 813, and 814 projected onto the lanes 821, 822, 823, and 824, respectively. A clustering algorithm may be applied to the embeddings, wherein clustering is a machine learning technique that involves grouping of data points. Given a set of data points, a clustering algorithm classifies each data point into a specific group. Clustering, i.e., concatenation requires that the grid sections be proximal, but not necessarily adjacent to one other. The feature vectors can thus be derived by developing corresponding clusters 811, 812, 813, and 814, respectively, from the lanes 821, 822, 823, and 824, respectively.

In one embodiment, an image analysis process may be based on image processing that includes hand-crafted feature analysis approach, which may include manually extracting features, then training of classifiers separately based on machine learning. Alternatively, or in addition, a deep learning approach may be employed to unify the feature extraction process and the classification step through several layers of the artificial neural network. During execution of an artificial neural network training process, the parameters of the artificial neural network will be learned, and then in real time the real time image is fed into the trained artificial neural network. Offline training and online analysis are based on a common approach that includes training to learn the unknown parameters, with the online analysis executed to feed images into the parameter-learned approach for classification.

The predicted lane(s) 475 that are output from the ANN inference phase 450 that is described with reference to FIG. 4 may be communicated to the vehicle controller 50, which may employ the predicted lane(s) 475 for generating warning or advisory information, or for vehicle dynamic control related to acceleration, braking and cornering. The predicted lane(s) 475 may also be communicated to the vehicle operator via the human-machine interface (HMI) device 55.

The predicted lane(s) 475 may also be communicated to the telematics system 60 for short-range vehicle-to-vehicle (V2V) communication, communication to an intelligent highway system, or communication to another extra-vehicle system.

When implemented on an embodiment of the vehicle 100 having autonomous functionality, the results from the predicted lane(s) 475 can be employed by the ADAS 20 to autonomously actuate vehicle braking. Furthermore, the predicted lane(s) 475 from the ANN inference phase 450 may be employed by the ADAS 20 to autonomously actuate a traction control system for mitigating condensation build-up on vehicle brakes. Furthermore, the predicted lane(s) 475 can be communicated via the telematics system 60 to other vehicles. Furthermore, the predicted lane(s) 475 can be employed by the ADAS 20 and the HMI device 55 to alert a driver.

Figure 6:
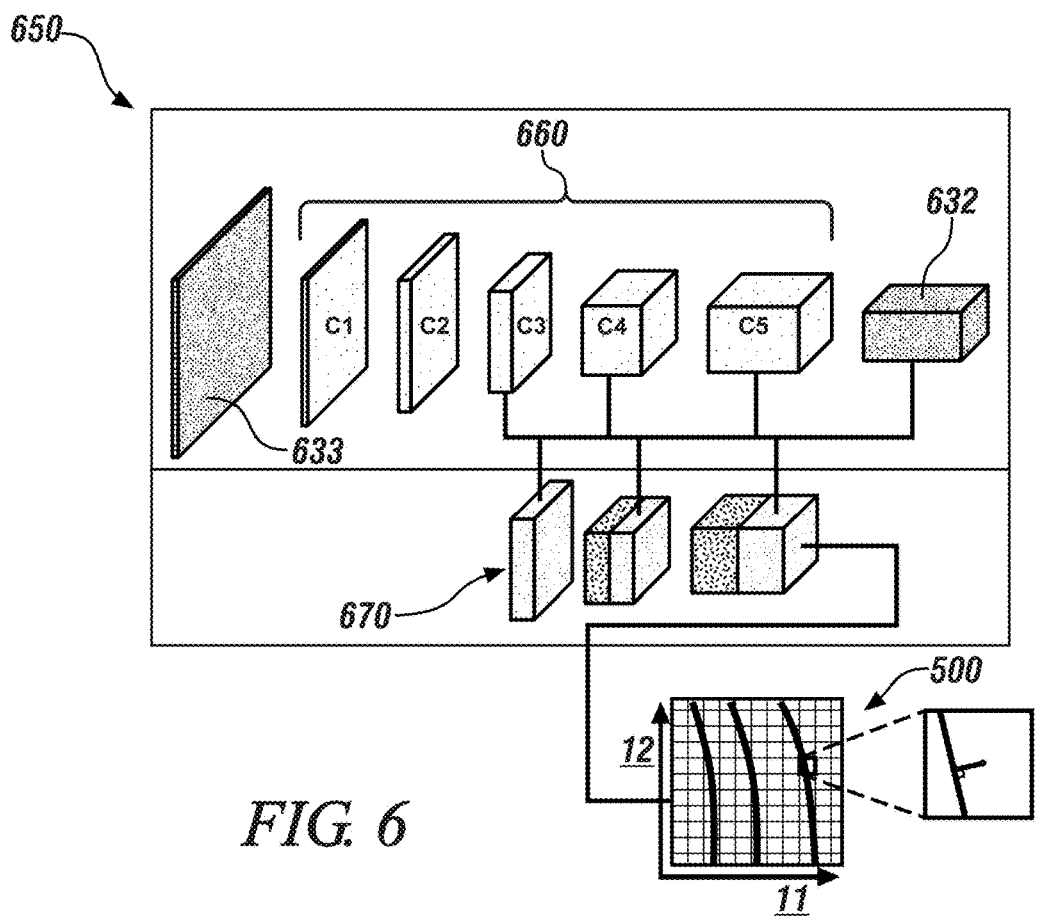
FIG. 6 schematically shows a portion of a method for processing images from an on-vehicle imaging sensor to form one or a plurality of predicted lanes that digitally represent a vehicle travel surface, including a layer of an artificial neural network (ANN) including ANN classification step having a plurality of convolutional layers and connected layers, in accordance with the disclosure.

FIG. 6 schematically illustrates an embodiment of a lane detection method 650, analogous to the lane detection method 400 that is described with reference to FIG. 4. The lane detection method 650 is described for processing BEV images 633, which originate as FOV images from the on-vehicle imaging sensor 32 of the vehicle 100. The lane detection method 650 is designed for general lane detection and localization in three dimensions, together with predicting each lane point location uncertainty. The input to the system is a single FOV image from a front facing imaging device, employing the ANN architecture illustrated in FIG. 4. Each image is passed through an encoder, with feature maps being projected to a Bird Eye View (BEV) perspective using inverse perspective mapping to form the BEV image 633 (indicated by 632). The output of the lane detection method 650 is a top view feature map, in a coarse resolution which is a downscaled version of the full resolution BEV image. Each pixel in the coarse feature map is referred to as a grid section and has real world dimensions in meters.

Figure 7:
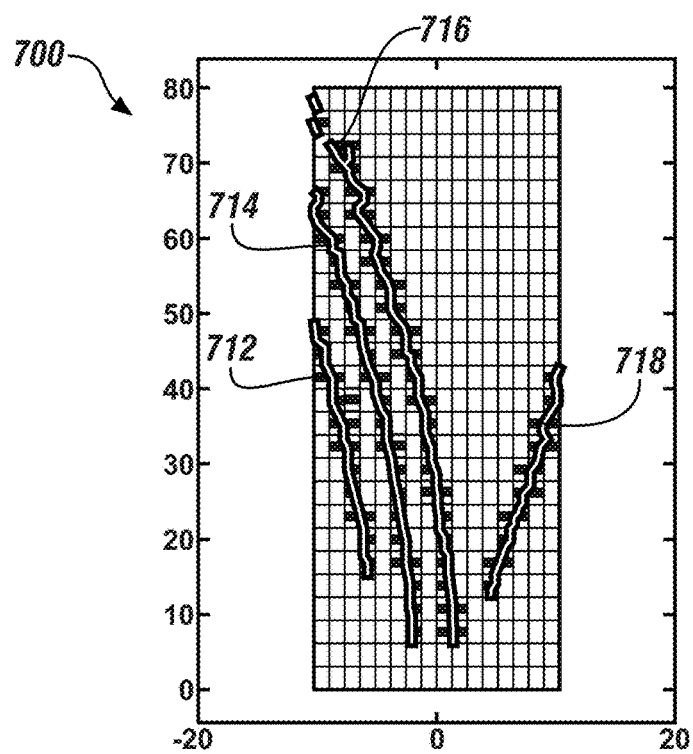
FIG. 7 schematically illustrates an example of a BEV feature map that includes a plurality of predicted lanes, in accordance with the disclosure.

The dual pathway architecture uses an encoder and inverse perspective mapping to project the feature maps to BEV in real world dimensions. The network includes two main processing pipelines, one in the FOV image view and the other in the BEV. The image view encoder is composed of residual network (resnet) blocks C1-C5 660, wherein each resnet block multiplies the number of channels of its former block. The BEV backbone includes projected image view feature maps, and concatenates each projected image feature map with the convoluted feature map from the former block. The final BEV feature map is the input to the lane prediction head (670). The lane detection method 650 approximates a lane segment passing through one of the BEV grid sections as a straight line with parameters that may be regressed. The regressed parameters are offset (in the xy plane), angle, and height (z offset) of the segment relative to the grid's center points, and are concatenated. An example of the BEV feature map 700 that includes a plurality of predicted lanes 712, 714, 716, and 718 is schematically illustrated with reference to FIG. 7.

Segment Offsets Prediction includes as follows. For each grid section, lane points that fall within the respective grid section are found. The straight line that passes through these points is parameterized, and its distance from the grid section center is extracted. This distance is the magnitude of the segment's normal to the grid section center ||Nxy|| and it will be denoted as r. The height offset Δz is calculated relative to the BEV plane associated with the feature maps, which is a function of the image sensor's pitch angle and height. This feature enables system's robustness to different cameras as the lane height is output relative to the camera mounting height $h_{cam}$ and orientation $\theta_{cam}$. The loss for the offsets prediction is as follows:

$$L_{offsets}=\|\hat{r}-r\|1+\|\hat{\Delta z}-\Delta z\|1 \qquad [1]$$

where ˆ. denotes the estimated attribute.

Segment orientation prediction includes as follows. Simply regressing an angle value is not trivial due to the cyclic nature of continuous angles. Another challenging property for angle prediction is the fact that angle distribution is usually multimodal. Angle estimation approaches range from regressing the sin and cos of the angle, to casting the problem as a classification problem [3]. Due to the multimodal property of the angle, a classification framework is employed in which the angle $\theta_{seg}$ is classified to be in one of four bins centered at $\alpha=(0, \pi, \pi, 3\pi)$, and regressing an offset relative to the chosen bin center. The angle bin estimation is optimized using a soft multi-label objective, and the ground truth is calculated as the segment's angle proximity to the $\alpha$ bin centers, e.g. for $\theta_{seg}=0$ the ground truth class probability vector would be $p\alpha=(1, 0, 0, 0)$ and for $\theta_{seg}=\pi$ the probability vector would be $p\alpha=(0.5, 0.5, 0, 0)$. The offsets 6a are calculated between the ground truth angle and the bin centers. The angle offsets are supervised not only on the ground truth angle bin but also on the bins adjacent to it. This ensures that even if the bin class was predicted erroneously, the delta offset would be able to fix it. The angle loss is the sum of the classification and offset regression losses, which is determined as follows:

$$L_{angle} = \sum_{a}[p_a \cdot \log S(\widehat{p_a}) + (1 - p_a) \cdot \log(1 - S(\widehat{p_a})) + m_a \cdot \|\widehat{\delta_a} - \delta_a\|_1] \qquad [2]$$

where $S(p\hat{\ }\alpha)$ is the Sigmoid function and ma is the indicator function masking only the relevant bins to learn the offset for.

Tiles Score Prediction:

In addition to the offsets and orientation, each grid section also outputs the probability of a lane passing through this grid section. The loss for this attribute is the binary cross entropy loss, as follows:

$$L_{score} = l \cdot \log \widetilde{P_{lane}} + (1-l) \cdot \log 1 - \widetilde{P_{lane}} \quad [3]$$

where l indicates whether the grid section is a background grid section, and $\widetilde{P_{lane}}$ is the network estimates for l.

The final grid sections loss is the sum over all the grid sections in the BEV grid and may be determined as follows:

$$L_{tiles} = \sum_{i=1}^{h_{bev}} \sum_{j=1}^{w_{bev}} \left( L_{score}^{ij} + l_{ij} \cdot L_{angle}^{ij} + l_{ij} \cdot L_{offsets}^{ij} \right) \quad [4]$$

wherein $h_{bev}$, $w_{bev}$ are the decimated BEV grid height and width, respectively and wherein the lane grid section indicator lij multiplies the angle and offsets losses because they are supervised only on lane grid sections.

From Grid Sections to Points

To go from prediction of segment score, offsets and orientation in each grid section to lane points, the grid sections scores are subjected to a threshold to identify only the lane grid sections. The polar terms $\hat{r}$ and $\theta_{s\widehat{eg}}$ are converted to cartesian coordinates and the points from the BEV plane are transformed to the camera coordinate frame by subtracting $h_{cam}$ and rotating by $-\theta_{cam}$, as follows.

$$\begin{bmatrix} \hat{x} \\ \hat{y} \\ \hat{z} \end{bmatrix} = \begin{bmatrix} 1 & 0 & 0 \\ 0 & \cos\theta_{cam} & \sin\theta_{cam} \\ 0 & -\sin\theta_{cam} & \cos\theta_{cam} \end{bmatrix} \cdot \begin{bmatrix} \hat{r} \cdot \cos\theta_{s\widehat{eg}} \\ \hat{r} \cdot \sin\theta_{s\widehat{eg}} \\ \hat{\Delta}z - h_{cam} \end{bmatrix} \quad [5]$$

The grid sections representation up until now assumes there is no relation between different grid sections, but the spatial relations exist in the data and are incorporated through the receptive field, and each grid section is learned independently. However, there is still a need for clustering the individual lane grid sections to form entire lane entities. A clustering mechanism may be employed directly on the lane segments, or another heuristic clustering may instead be employed. Another possibility is to use learned features that discriminate between grid sections belonging to different lanes. In one embodiment, a discriminative loss function is used that pulls the features of grid sections belonging to the same lane closer together in an embedded space, while pushing the features of grid sections belonging to different lanes further away from each other in that space. The discriminative loss on the decimated grid sections grid requires far less computations than when operating at the pixel level. Given the learned feature, a simple mean-shift algorithm is employed to extract the grid sections that belong to individual lanes. The loss can be formalized as follows.

$$L_{embedding} = L_{var} + L_{dist} \quad [6]$$

wherein $L_{var}$ is the pulling force and $L_{dist}$ is the pushing force.

These terms are determined as follows:

$$L_{var} = \frac{1}{C}\sum_{c=1}^{C} \frac{1}{C}\sum_{i=1}^{h_{bev}} \sum_{j=1}^{w_{bev}} [\|\mu_c - l_{ij}^c \cdot f_{ij}\| - \delta_v]_+^2 \quad [7]$$

$$L_{dist} = \frac{1}{C(C-1)}\sum_{c_A=1}^{C} \sum_{c_B=1}^{C} c_A \neq c_B [\delta_d - \|\mu_{cA} - \mu_{cB}\|]_+^2 \quad [8]$$

wherein:

C is the number of lanes, which may vary;

Nc is the number of grid sections belonging to lane c, and $l_{cij}$ indicates the grid sections belonging to lane c such that the following relationship is valid:

$$\sum_{c=1}^{C} \frac{1}{C}\sum_{i=1}^{h_{bev}} \sum_{j=1}^{w_{bev}} l_{ij}^c = N_c \quad [9]$$

The losses constrain the distances to be up to $\delta_v$ and the cross clusters distance to be greater than $\delta_d$. As a result, a new lane representation which results in accurate and robust lane detection and localization is provided.

The concepts described herein provide a method for determining a representation for accurate general 3D lane detection, including curved lanes. The representation uses grid sections that are positioned on a Bird's Eye View (BEV) grid that includes a determination, in one embodiment, that locally, in each grid section, the lane is linear in BEV. Alternatively, the lane may be determined to be non-linear in BEV, e.g., represented by a parametric equation such as a second degree polynomial. This leads to derivation of a compact and efficient lane representation per grid section. This allows for an overall efficient, low-resolution representation, which preserves the fine-resolution for the lane representation.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for detecting a travel lane proximal to a vehicle, the method comprising:
   capturing, via an imaging sensor, a field-of-view (FOV) image of a viewable region that includes a travel surface;
   converting, via an artificial neural network, the FOV image to a plurality of feature maps;
   projecting, via an inverse perspective mapping routine, the plurality of feature maps to a bird's eye view (BEV) orthographic grid, wherein the BEV orthographic grid includes a plurality of grid sections representing a ground truth of the travel surface, wherein the feature maps include travel lane segments and feature embeddings in the plurality of grid sections of the BEV orthographic grid, wherein each of the plurality of grid sections includes an elevation, an offset magnitude, and an angle of an orthogonal line arranged between a center point of the respective grid section and a lane edge of the respective travel lane segment that is disposed within the respective grid section;
   concatenating the travel lane segments for the plurality of grid sections based upon the feature embeddings to form a predicted lane in the BEV orthographic grid, wherein the predicted lane is associated with the travel lane proximal to the vehicle; and
   controlling operation of the vehicle based upon the predicted lane.

2. The method of claim 1, wherein concatenating the travel lane segments comprises linking together the travel lane segments that are contained in adjacent ones of the grid sections.

3. The method of claim 1, wherein the travel lane segments are represented as straight line segments in the plurality of grid sections, and wherein each of the predicted lanes comprises a concatenated set of the straight line segments in adjacent ones of the plurality of grid sections.

4. The method of claim 1, wherein the travel lane segments are represented as non-linear lanes in the plurality of grid sections, and wherein each of the predicted lanes comprises a concatenated set of the non-linear lanes in adjacent ones of the plurality of grid sections.

5. The method of claim 1, wherein concatenating the travel lane segments for the plurality of grid sections comprises clustering the feature embeddings to achieve separation to individual travel lanes.

6. The method of claim 1, wherein each of the travel lane segments is parameterized as a normal vector that is defined in relation to a center point of the grid section, the normal vector being defined by a magnitude, a direction, and an altitude in relation to the center point of the grid section.

7. The method of claim 1, wherein controlling operation of the vehicle based upon the predicted lane comprises controlling, via an advanced driver assistance system, one of a propulsion system, a steering system, or a braking system.

8. The method of claim 1, wherein controlling operation of the vehicle based upon the predicted lane comprises updating an on-vehicle map based upon the predicted lane.

9. The method of claim 1, wherein controlling operation of the vehicle based upon the predicted lane comprises controlling an on-vehicle navigation system based upon the predicted lane.

10. The method of claim 1, wherein capturing the field-of-view (FOV) image of the viewable region that includes the travel surface comprises capturing the field-of-view (FOV) image of the viewable region that includes the travel surface that is forward of the vehicle.

11. A method for detecting travel lanes forward of a vehicle, the method comprising:
    capturing, via an imaging sensor, a field-of-view (FOV) image of a viewable region that is forward of the vehicle;
    converting, via an artificial neural network, the FOV image to a plurality of feature maps;
    projecting, via an inverse perspective mapping algorithm, the FOV image to a bird's eye view (BEV) orthographic grid, wherein the BEV orthographic grid includes a plurality of grid sections representing a ground truth; wherein the feature maps include travel lane segments and feature embeddings in the plurality of grid sections of the BEV orthographic grid, wherein each of the plurality of grid sections includes an elevation, an offset magnitude, and an angle of an orthogonal line arranged between a center point of the respective grid section and a lane edge of the respective travel lane segment that is disposed within the respective grid section, and wherein the travel lane segments are represented as line segments in the plurality of grid sections;
    concatenating the travel lane segments for the plurality of grid sections based upon the feature embeddings to form a plurality of three-dimensional predicted lanes in the BEV orthographic grid, wherein the three-dimensional predicted lanes are associated with the travel lanes proximal to the vehicle; and
    employing the predicted lanes to control an operation of the vehicle.

12. The method of claim 11, wherein employing the three-dimensional predicted lanes to control an operation of the vehicle comprises employing the three-dimensional predicted lanes to construct a localized map.

13. The method of claim 11, wherein employing the three-dimensional predicted lanes to control an operation of the vehicle comprises employing the three-dimensional predicted lanes to control operation of the vehicle.

14. The method of claim 13, wherein the vehicle includes an advanced driver assistance system operatively connected to a propulsion system, a steering system, or a braking system; and wherein employing the three-dimensional predicted lanes to control an operation of the vehicle comprises employing the three-dimensional predicted lanes to control operation of the advanced driver assistance system of the vehicle.

15. The method of claim 11, wherein employing the three-dimensional predicted lanes to control operation of the vehicle comprises updating an on-vehicle map based upon the three-dimensional predicted lanes.

16. The method of claim 11, employing the three-dimensional predicted lanes to control operation of the vehicle comprises controlling an on-vehicle navigation system based upon the three-dimensional predicted lanes.

17. The method of claim 11, wherein the travel lane segments are represented as non-linear lanes in the plurality of grid sections, and wherein each of the three-dimensional predicted lanes comprises a concatenated set of the non-linear lanes in adjacent ones of the plurality of grid sections.

18. The method of claim 11, wherein concatenating the travel lane segments for the plurality of grid sections based upon the feature embeddings comprises clustering the feature embeddings to achieve separation to individual travel lanes.

19. The method of claim 11, wherein each of the straight line segments is parameterized as a normal vector that is defined in relation to a center point of the grid section, the normal vector being defined by a magnitude, a direction, and an altitude in relation to the center point of the grid section.

\* \* \* \* \*